Nov. 28, 1967     D. S. ERKFRITZ     3,354,526

MILLING TOOL

Filed May 25, 1964

INVENTOR.
Donald S. Erkfritz
BY
Barnard, McGlynn & Reising
ATTORNEYS

United States Patent Office 3,354,526
Patented Nov. 28, 1967

3,354,526
MILLING TOOL
Donald S. Erkfritz, Clarkston, Mich., assignor to Futurmill, Inc., Southfield, Mich., a corporation of Michigan
Filed May 25, 1964, Ser. No. 369,838
15 Claims. (Cl. 29—96)

This invention relates to metal cutting tools and, in particular, to a milling cutter, such as an end mill, boring tool or the like, comprising a rotatable body including means defining one or more blade-receiving pockets on said body, a cutter blade or insert of suitable material seatable within each pocket and including a plurality of cutting edges, and fastening means for firmly seating and positively locking each blade in its associated pocket so that one selected cutting edge of the blade is automatically disposed in a predetermined desired position axially, radially and otherwise relative to the axis of rotation of the body, while the fastening means permits indexing the cutter blade to expose another cutting edge in cutting relation to a work piece and automatically disposed in the same position on the body as a previous cutting edge.

The present invention to be described more fully hereinafter has been developed with specific reference to end mills. However, as the description of the invention proceeds, it will become readily apparent that the invention may be employed to advantage with other types of milling cutters or metal cutting tools, in general. Accordingly, while the following detailed description of a preferred embodiment of the invention will be made with specific reference to an end mill in order to facilitate an understanding of the invention, it will be understood that it may be utilized with specifically different tools in the metal cutting art.

It has been proposed heretofore to seat a cutter blade in a blade-receiving pocket of an end mill of the type to which the present invention particularly pertains by utilizing a locking fastener rotatably seated in the end mill body and including an eccentric head portion cooperable with an aperture in the cutter blade to cam an edge surface of the latter against a locating surface on the body. As a result, an edge surface of a given blade has been seated against such locating surface to dispose the blade in a desired position axially and radially of the body, while frictional engagement between the coacting surfaces of the eccentric head of the fastener and the aperture in the cutter blade have been relied upon to hold a side surface of the blade against a mounting platform forming a part of the blade-receiving pocket. While such a construction has apparently enjoyed some commercial success, it is not without disadvantages.

More specifically, where it is desired or even necessary to seat two adjacent edge surfaces of a cutter blade against two locating surfaces on the mill body as well as a side surface of the blade against the mounting platform aforementioned, it will be readily apparent that a fastener having an eccentric head or cam is totally unacceptable. In other words, as such a fastener is rotated to cause the eccentric head thereof to translate or drive the cutter blade against one locating surface, somewhere within the range of arcuate movement of the eccentric head, one edge surface of the blade will seat against one locating surface thereby preventing further rotation of the eccentric head in seating of the other edge surface of the blade against the other locating surface.

In view of the foregoing considerations, the present invention is directed in accordance with one preferred embodiment thereof to an improved metal cutting tool, particularly an end mill or other similar milling cutter, characterized by a rotatable body including means defining at least one blade-receiving pocket thereon including a mounting platform and a pair of angularly related locating surfaces projecting relative thereto, an opening in the aforementioned platform having its axis substantially intersecting, within normal manufacturing tolerances, the bisector of the angle defined by the aforementioned locating surfaces, a cutter blade including a pair of side surfaces joined by a plurality of angularly related edge surfaces forming a plurality of cutting edges at the juncture of such edge surfaces with at least one of such side surfaces, an aperture extending through the cutter blade and having its axis substantially intersecting, within normal manufacturing tolerances, the aforementioned bisector of the angle defined by the aforementioned locating surfaces, the respective axis of the aperture in the blade and the aperture of the opening being "mismatched"; that is, such axes being non-coincident, whereby one axis is closer to the apex of the angle defined by the locating surfaces than is the other axis, and fastener means extending through the aperture in the cutter blade and into the opening to draw one side surface of the cutter blade into positive engagement with the mounting platform while substantially simultaneously and equally translating or drawing two adjacent angularly related edge surfaces of the cutter blade in firm seating engagement with the respective locating surfaces aforementioned.

The aforementioned blade-receiving pocket, or all of them where a plurality are employed, are formed in a predetermined position axially, radially and otherwise relative to the axis of rotation of the body. As a consequence, simply seating the blade, or all of them, against the respective pair of angularly related locating surfaces of each blade-receiving pocket automatically disposes such blade or blades in the predetermined desired position. Furthermore, the aforementioned fastener means may be loosened to permit indexing a cutter blade in a blade-receiving pocket to engage two other adjacent edge surfaces thereof with the respective locating surfaces to provide a fresh cutting edge which is automatically disposed in the aforementioned predetermined desired position.

The invention is further specifically characterized by the fact that the axis of the aperture in the cutter blade is substantially equidistantly spaced from the respective cutting edges thereof, whereby the fastener means may be loosened and the blade indexed to present a fresh cutting edge to a work piece, the fresh cutting edge thereby being automatically disposed in substantially the same position as a previous cutting edge merely by again reseating two of the edge surfaces of the cutter blade against the aforementioned pair of locating surfaces.

A further feature of the invention resides in the fact that the diameter of the aperture in the cutter blade is larger than the diameter of the opening in the body to freely pass the fastener means therethrough, not withstanding the aforementioned "mismatch." In this regard, it is preferred that the amount of "mismatch" between the respective axes of the cutter blade aperture and opening in the tool body be in the order of approximately .005 inch or greater and, preferably, in the range of from approximately .011 inch to .017 inch, thereby insuring sufficient "mismatch" to provide firm tight engagement of a selected pair of edge surfaces of the cutter blade with the respective locating surfaces on the cutter body.

Still further, it is preferred that the fastener means and aperture in the cutter blade include cooperably engageable conically tapered portions to positively lock a blade in its associated pocket, the included angle of taper of which portions are substantially identical, the conically tapered portion of the fastener means being substantially entirely seatable within the conically tapered portion of the aperture in the cutter blade so as not to project from a side surface of the latter, thereby avoiding any impedance to chip flow.

According to another preferred embodiment of the invention, the aperture in the cutter blade is conically tapered from both ends; that is, a pair of conically tapered portions of such aperture respectively communicate with each of the side surfaces of the aforementioned cutter blade. Furthermore, the junctures of the respective edge surfaces of each blade define with both side surfaces thereof a plurality of cutting edges. As a consequence, such a blade may not only be rotatably indexed to dispose any one of a plurality of cutting edges defined by such edge surfaces and one side surface thereof in working relationship with a work piece, but the blade may be turned side for side to expose a fresh set of cutting edges defined by such edge surfaces and the other side surface of the blade, the latter cutting edges being rotatably indexable to multiply, or double, the number of available cutting edges.

These and other features and advantages of the invention will appear more fully hereinafter as the description thereof proceeds, reference being made to the drawing in which.

Figure 1:
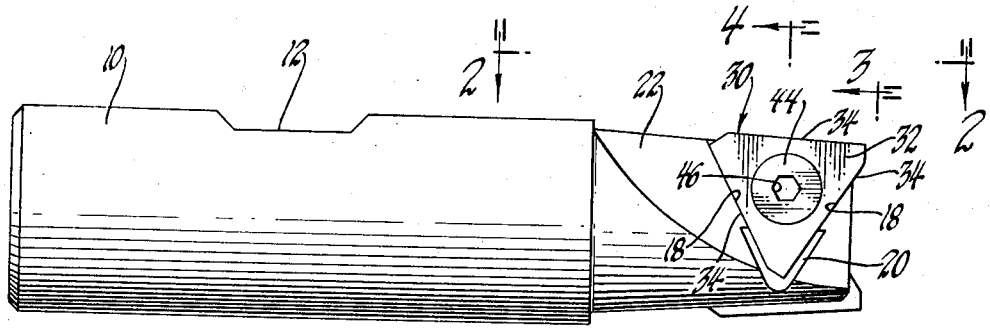
FIGURE 1 is a side elevational view of a cutting tool, in this case an end mill, illustrating a preferred embodiment of the invention.
Figure 2:
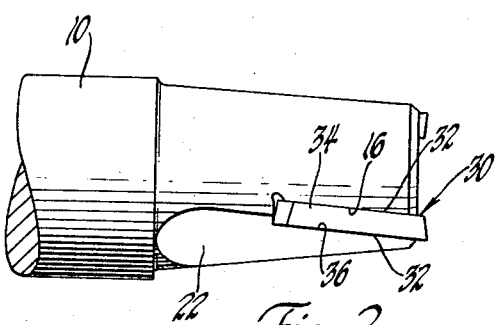
FIGURE 2 is a fragmentary view taken on line 2—2 of FIGURE 1.
Figure 3:
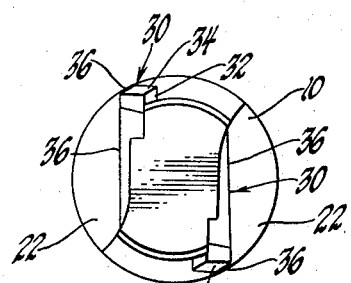
FIGURE 3 is a view taken on line 3—3 of FIGURE 1.

Referring now to the drawing, and particularly the embodiment illustrated in FIGURES 1 through 5 thereof, there is illustrated an end mill comprising a conventional tool holder or body 10 having a suitable flat or key way 12 for mounting the tool holder or body on a power driven appliance adapted to rotate the tool holder or body and the cutter blades carried thereby to mill a work piece. The particular tool holder or body aforementioned includes two blade-receiving pockets indicated generally at 14 in FIGURE 5 and which are substantially identical, it being understood that the tool holder or body may be equipped with merely one blade-receiving pocket or a plurality thereof in excess of two as the situation warrants.

More specifically, each blade-receiving pocket 14 includes a substantially planar mounting platform 16 suitably machined or otherwise formed integral with the tool holder or body, and a pair of angularly related locating surfaces 18 machined from or otherwise suitably formed integral with such tool holder or body and upstanding or projecting from the aforementioned mounting platform. A generally triangularly shaped recess 20 communicates with each blade-receiving pocket primarily for manufacturing purposes, while a chip pocket 22 is also associated with each blade pocket to facilitate smooth flow of chips removed from the work piece.

Figure 4:
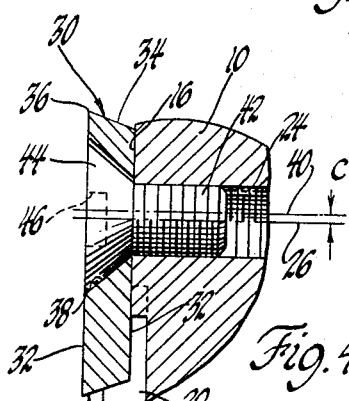
FIGURE 4 is an enlarged somewhat exaggerated sectional view taken on line 4—4 of FIGURE 1.
Figure 5:
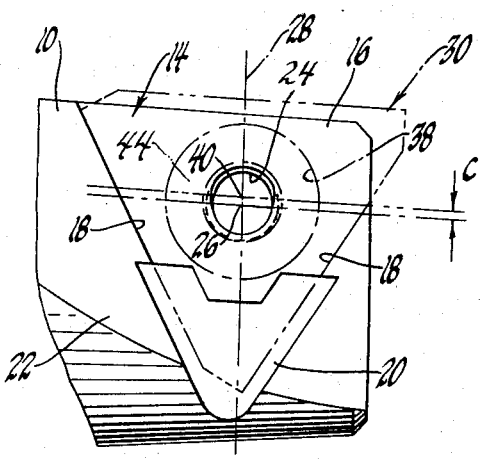
FIGURE 5 is an enlarged fragmentary view of the blade-receiving pocket of the tool illustrated in FIGURE 1 with the cutter blade being illustrated in phantom.

A threaded circular opening 24 extends into the tool holder or body 10 from the mounting platform 16 of each blade-receiving pocket and has its axis, indicated at 26 in FIGURES 4 and 5, disposed substantially in a plane, illustrated at 28 in FIGURE 5, extending substantially perpendicularly to the planar surface of the mounting platform 16 and substantially bisecting the angle defined by the angularly related locating surfaces 18.

A polygonally shaped cutter blade, in this case a triangular blade indicated generally at 30, of suitable material such as hard tungsten carbide is provided for each blade-receiving pocket. The blades are substantially identical, and each comprises the substantially parallel planar side surfaces 32 and in this instance, three angularly related edge surfaces 34 extending between and joining the aforementioned side surfaces of the cutter blade, the points or lines of intersection of each adjacent pair of such edge surfaces being in this case, but not necessarily so, chamfered off to provide wiping flats. The junctures or lines of intersection between such edge surfaces 34 and at least one of the side surfaces 32 respectively define three angularly related cutting edges 36. A conically tapered aperture 38 extends entirely through each cutter blade between and substantially perpendicularly to the side surfaces 32 thereof. The axis of such aperture, indicated at 40 in FIGURES 4 and 5, is substantially equidistantly spaced from each of the cutting edges 36 for a purpose to appear more fully hereinafter.

With particular reference to FIGURES 4 and 5, disposing a given cutter blade 30 in its associated blade-receiving pocket 14 with an adjacent pair of the edge surfaces 34 in finger tight engagement with the respective locating surfaces 18 and one planar side surface 32 disposed flush in finger tight engagement with the plane of the mounting platform 16, results in the respective axes 26 and 40 of the threaded opening 24 in the body and conically tapered aperture 38 in the cutter blade being "mismatched"; that is, that the axis of the conically tapered aperture 40 in the cutter blade is more remote from the apex of the angle defined by the locating surfaces 18 than is the axis of the threaded opening 26. It will be further noted that the axis 40 of the conically tapered aperture 38 in the cutter blade is, like the axis 26 of the threaded opening 24 and within normal manufacturing tolerances, disposed substantially in a plane normal to the plane of the mounting platform 16 and bisecting the aforementioned angle defined by the locating surfaces 18. In other words, the respective axes 26 and 40 are parallel, non-coincident and normal to the plane of the mounting platform 16, and are disposed within normal manufacturing tolerances substantially within a plane bisecting the apex of the aforementioned angle. As illustrated particularly in FIGURE 5, the diameter of the smallest portion of the tapered conical aperture 38 in the cutter blade is greater than the diameter of the threaded opening 24 in the tool holder or body 10 so that a threaded locking screw to be described hereinafter may freely pass through the aperture in the cutter blade for threaded engagement with a threaded opening 24. With particular reference to FIGURES 4 and 5, the "mismatch" indicated at C between the respective axes 26 and 40 is preferably in the order of .005 inch or greater and, in the particular end mill illustrated, such "mismatch" falls in the range of approximately .011 inch to .017 inch. However, it will be readily apparent that the amount of "mismatch" may vary so long as it is sufficient to draw the cutter blade into tight seating engagement with respective surfaces of the blade-receiving pocket as to be described hereinafter.

A threaded locking screw 42 including a coaxial conically tapered head portion 44 having a hexagonally shaped recess 46 is adapted to removably threadably engage the threaded opening 24 in the tool holder or body 10 while the aforementioned head portion thereof seats substantially entirely within the conically tapered aperture 38 in the cutter blade and a portion of the circumferential extent thereof coacts with generally line contact with a portion of the circumferential extent of the aperture to bias any two angularly related adjacent edge surfaces 34 thereof into firm seating engagement with the respective locating surfaces 18, while the coaction between the head portion 44 of the locking screw and the conically tapered aperture 38 in the cutter blade serves to draw one side surface 32 thereof into firm flush seating engagement with the mounting platform 16 as illustrated particularly in FIGURE 4. At this juncture it is again noted that the axis of the conically tapered head portion 44 of the locking screw is substantially coaxial with the threaded portion of the latter, and it is pointed out that the included angles of taper of the head portion of the screw and of the conically tapered aperture in the cutter blade are substantially identical within relatively close tolerances. In this regard, such angle of taper is preferably in the order of approximately 82° plus or minus tolerances of a few thousandths. It is also to be noted that the end of head portion 44 of the locking screw is at least substantially flush with the adjacent side surface 32 of the blade so as not to impede chip flow.

In operation, it will now be appreciated that a cutter blade 30 may be mounted within its associated blade-receiving pocket in finger tight engagement therewith wherein an adjacent pair of the angularly located edge surfaces 34 of the blade will respectively seat against the locating surfaces 18, while one side surface 32 of the cutter blade will rest flush against the mounting platform 16. At this time, the predetermined desired amount of "mismatch" as indicated at C in FIGURES 4 and 5 will exist. The locking screws 42 is then inserted through the conically tapered aperture 38 in the cutter blade and threadably engaged with the threaded opening 24 in the tool holder or body 10. Thereafter, the locking screw may be tightened into the threaded opening or rotated and translated axially therealong, ultimately causing one portion of the circumferential extent of the conically tapered head portion 44 thereof to pick up or engage in general line contact a corresponding circumferential extent of the conically tapered aperture 38 in the cutter blade. As the locking screw is threaded home, using a suitable tool engaged in opening 46, into the threaded opening 24, axial translation of the head portion 44 thereof causes the cutter blade 30 to shift along the mounting platform toward the apex of the angle defined by the locating surfaces 18, and along the bisector of such angle. With the locking screw driven home, it will be immediately apparent that one side surface 32 of the cutter blade is held in firm flush engagement with the mounting platform 16, while selected adjacent angularly related edge surfaces 34 of the cutter blade have been substantially simultaneously and equally biased into tight engagement with the respective locating surfaces 18. As a result, a cutter blade is held positively in a firm seated position in its associated blade-receiving pocket which, as aforementioned, has been provided with the mounting platform 16 and locating surfaces 18 disposed in predetermined positions radially, axially and otherwise relative to the axis of rotation of the tool holder or body 10 to provide the desired run-out, clearance and rake angles. In this regard, in the specific end mill shown, the locations of the mounting platform 16 and locating surfaces 18 relative to the axis of rotation of the tool body is such as to provide a radial rake angle of minus 35°, an axial rake angle of plus 5°, a lead angle of 0° and an axial run-out or stick-out of .030 inch. Needless to say, other rake angles, lead angles and run-out may be built into the tool holder or body as desired.

After a given cutting edge 36 of a given cutter blade or blades has been used in machining a work piece to the extent that it is desired to present a fresh cutting edge to such work piece, it will be further apparent that the locking screw 42 may be loosened to permit rotatably indexing the cutter blade to present a fresh cutting edge to the work piece. Upon so indexing the cutter blade, another adjacent pair of the angularly related edge surfaces 34 thereof are seated against the locating surfaces 18, and the side surface 32 of the cutter blade seated against the mounting platform upon tightening of the locking screw in the manner aforementioned. As a result, with a triangular blade as shown, up to three cutting edges 36 are provided from a single cutting blade and, upon indexing any one of the three cutting edges into working relation to the work piece, it will be manifest that such cutting edge is automatically disposed with the desired rake angles and the like with respect to the tool holder or body and in substantially the same position as a previous fresh cutting edge.

Figure 6:
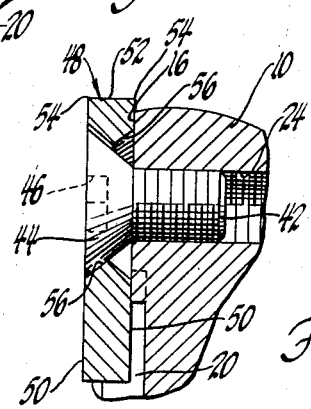
FIGURE 6 is a sectional view corresponding generally to FIGURE 4, but illustrating another preferred embodiment of the invention.

Referring now to FIGURE 6, it may be first observed that this embodiment is identical to that previously described except for a modification in the cutter blades employed. Accordingly, like numerals are employed with respect to this embodiment of the invention to illustrate parts previously described. Thus, in this embodiment, the cutter blades indicated generally at 48 each comprises a pair of substantially parallel planar side surfaces 50 as described above respectively joined by a plurality of angularly related edge surfaces 52 which may be chamfered adjacent their respective points of intersection as previously described. In this embodiment, the edge surfaces 52 are each disposed at substantially right angles to the planes of both of the respective side surfaces 50 of the blades to define the cutting edges 54; that is, six cutting edges for a triangular blade. Furthermore, each blade is provided with an aperture comprised of a pair of conically tapered portions 56 respectively communicating with and tapering inwardly from respective ones of the side surfaces 50 of the blade, and meeting inwardly of the body of the blade. The conically tapered portions are coaxial with each other so that the axis of the aperture theredefined again is disposed with a suitable amount of "mismatch" as previously described. Furthermore, the included angle of taper of the respective tapered portions 56 of the aperture are substantially identical to each other, and identical to the angle of taper of the conically tapered head portion 44 of the locking screw 42, such angle of taper preferably being in the order of that previously described.

In the operation of this embodiment, it may be first noted that a cutter blade 48 may have one side surface 50 thereof disposed against the mounting platform 16 of its associated blade-receiving pocket and any two adjacent angularly related edge surfaces 52 seated against the respective locating surfaces 18 as previously described. Furthermore, the threaded locking screw 42 may be loosened to permit relative rotary indexing of the cutter blade 48 to dispose any one of three fresh cutting edges 54 to the work piece as likewise previously described. However, this embodiment differs from that previously described in that, and referring to the triangular blade specifically disclosed, once all three of the cutting edges 54 adjacent one side surface 50 of the cutter blade have been utilized on a work piece, the threaded locking screw 42 may be removed from the tool holder or body 10 and the cutter blade indexed side for side to dispose the opposite side surface 50 in flush engagement with the mounting platform 16 of the associated blade-receiving pocket. As a result, three additional cutting edges 54 are provided which may be successively rotatably indexed as previously described. As a result, with a triangular blade, a total of six cutting edges are provided, and it will be readily apparent that the number of available cutting edges will vary proportionately to the particular polygonal shape of the cutter blade employed.

Finally, irrespective of the embodiment employed, it will be readily apparent that the tool holder or body 10 is adapted to receive substantially identical cutter blades. In other words, once all available cutting edges on a given cutter blade have been employed, the cutter blade may be thrown away and a completely new cutter blade inserted in the associated blade-receiving pocket to result, for reasons set forth above, in such a new cutter blade being automatically disposed in the tool holder or body in the predetermined desired position aforementioned.

While but two forms of the invention have been shown and described, other forms will now be readily apparent to those acquainted with this art. Therefore, it is to be understood that the embodiments illustrated in the drawing and described above are merely for illustrative pur-

I claim:

1. A metal cutting tool comprising a body, means defining a blade-receiving pocket on said body including a mounting platform and a pair of angularly related locating surfaces, an opening in said platform having its axis substantially intersecting the bisector of the angle defined by said locating surfaces, a cutter blade including an aperture extending therethrough, the axis of said aperture being substantially parallel to the axis of said opening and substantially intersecting the bisector of the angle defined by said locating surfaces in a location more remote from the apex of said angle than is the location of the axis of said opening, and a single fastener member extending commonly through said aperture and into said opening and secured to said body, said fastener member drawing said cutter blade substantially equally into engagement with said respective locating surfaces.

2. The invention as defined in claim 1 wherein said aperture in said cutter blade includes a conically tapered portion, and said fastener member includes a conically tapered head portion seatable substantially entirely within said conically tapered portion of said aperture.

3. A metal cutting tool comprising a body, means defining a blade-receiving pocket on said body including a mounting platform and a pair of angularly related locating surfaces, an opening extending into said body from said mounting platform and having its axis substantially located in a plane extending substantially perpendicularly to said mounting platform and bisecting the angle defined by said locating surfaces, a polygonal cutter blade including a pair of side surfaces joined by a plurality of angularly related edge surfaces, an aperture extending entirely through said cutter blade between said side surfaces thereof, the axis of said aperture being substantially parallel to the axis of said opening and being located substantially in said plane in a location more remote from the apex of said angle than is the location of the axis of said opening, and a single fastener member extending commonly through said aperture and into said opening and secured to said body, said fastener member substantially simultaneously and equally drawing an adjacent pair of said edge surfaces of said cutter blade into engagement with said respective locating surfaces.

4. The invention as defined in claim 3 wherein said aperture in said cutter blade includes a conically tapered portion communicating with and tapering inwardly from one of said side surfaces of said cutter blade toward the other of said side surfaces thereof, and said fastener member includes a conically tapered head portion seatable substantially entirely within said conically tapered portion of said aperture.

5. The invention as defined in claim 4 wherein said aperture in said cutter blade includes a second conically tapered portion communicating with and tapering inwardly from said other of said side surfaces of said cutter blade.

6. A metal cutting tool comprising a body, means defining a blade-receiving pocket on said body including a planar mounting platform and a pair of angularly related locating surfaces projecting therefrom, an opening extending into said body from said mounting platform and having its axis substantially perpendicularly to the plane of said mounting platform and substantially intersecting the bisector of the angle defined by said locating surfaces, a polygonal cutter blade including a pair of planar substantially parallel side surfaces joined by a plurality of angularly related edge surfaces, the intersections of said edge surfaces with at least one of said side surfaces defining a plurality of cutting edges, an aperture extending entirely through said cutter blade between and substantially perpendicularly to said side surfaces thereof, the axis of said aperture being substantially parallel to the axis of said opening and substantially intersecting the bisector of the angle defined by said locating surfaces in a location more remote from the apex of said angle than is the location of the axis of said opening, and a single fastener member extending commonly through said aperture and into said opening and secured to said body, said fastener member drawing one of said side surfaces of said cutter blade into engagement with said mounting platform and substantially simultaneously and equally drawing an adjacent pair of said edge surfaces of said cutter blade into engagement with said respective locating surfaces.

7. The invention as defined in claim 6 wherein the axis of said aperture in said cutter blade is substantially equidistantly spaced from said cutting edges thereof.

8. The invention as defined in claim 7 wherein said mounting platform and said locating surfaces are formed integral with said body.

9. A metal cutting tool comprising a body, means defining a blade-receiving pocket on said body including a planar mounting platform and a pair of angularly related locating surfaces projecting therefrom, a threaded opening extending into said body from said mounting platform and having its axis extending substantially perpendicularly to the plane of said mounting platform and substantially intersecting the bisector of the angle defined by said locating surfaces, a polygonal cutter blade including a pair of planar substantially parallel side surfaces joined by a plurality of angularly related edge surfaces, the intersections of said edge surfaces with at least one of said side surfaces defining a plurality of cutting edges, an aperture extending entirely through said cutter blade between and substantially perpendicularly to said side surfaces thereof and including a conically tapered portion communicating with and tapering inwardly from said one of said side surfaces of said cutter blade toward the other of said side surfaces thereof, the axis of said aperture being substantially parallel to the axis of said opening and substantially intersecting the bisector of the angle defined by said locating surfaces in a location more remote from the apex of said angle than is the location of the axis of said opening, and a single threaded fastener member extending through said aperture in said cutter blade and threadably engaging said threaded opening, said fastener member including a conically tapered head portion seated substantially entirely within said conically tapered portion of said aperture of said cutter blade so as to extend no higher than the plane of said one of said side surfaces thereof, whereby threaded engagement of said fastener member in said threaded opening draws said other of said side surfaces of said cutter blade into positive engagement with said mounting platform and substantially simultaneously and equally draws an adjacent pair of said edge surfaces of said cutter blade into engagement with said respective locating surfaces.

10. The invention as defined in claim 9 wherein the axis of said aperture in said cutter blade is substantially equidistantly spaced from said cutting edges thereof.

11. The invention as defined in claim 10 wherein said mounting platform and said locating surfaces are formed integral with said body.

12. The invention as defined in claim 9 wherein the included angle of taper of said respective tapered portions of said aperture and said fastener member are substantially equal.

13. The invention as defined in claim 9 wherein said aperture in said cutter blade includes a second conically tapered portion communicating with and tapering inwardly from said other of said side surfaces of said cutter blade.

14. The metal cutting tool as defined in claim 9 wherein the distance between the respective axes of said threaded opening in said body and said aperture in said cutter blade is in excess of approximately .005 inch.

15. The metal cutting tool as defined in claim 9 wherein the axis of said aperture in said cutter blade is more remote from the apex of the angle defined by said locating surfaces than is the axis of said threaded opening in said cutter blade by a distance in the range from approximately .005 inch to .017 inch.

References Cited

UNITED STATES PATENTS

| | | | |
|---|---|---|---|
| 1,838,520 | 12/1931 | Archer | 29—96 |
| 2,598,581 | 5/1952 | McKenna | 29—96 |
| 3,102,326 | 9/1963 | Conti | 29—96 |
| 3,146,656 | 9/1964 | Richards | 29—96 X |
| 3,173,191 | 3/1965 | Alexander | 29—96 |

FOREIGN PATENTS 662,048　4/1963　Canada.

HARRISON L. HINSON, *Primary Examiner.*